United States Patent [19]

Rocklin

[11] Patent Number: 4,551,603

[45] Date of Patent: Nov. 5, 1985

[54] DEVICE AND METHOD FOR SURFACING A WORKPIECE

[76] Inventor: Isadore J. Rocklin, 3240 Douglas St., Sioux City, Iowa 51104

[21] Appl. No.: 639,112

[22] Filed: Aug. 9, 1984

Related U.S. Application Data

[60] Continuation-in-part of Ser. No. 900,245, Apr. 26, 1978, abandoned, which is a continuation of Ser. No. 721,831, Sep. 9, 1976, abandoned, which is a continuation-in-part of Ser. No. 550,824 Feb. 18, 1975, which is a continuation-in-part of Ser. No. 332,216, Feb. 13, 1973, Pat. No. 3,878,351, which is a division of Ser. No. 451,059, Mar. 14, 1974, abandoned, which is a division of Ser. No. 130,734, Apr. 2, 1971, abandoned, which is a continuation-in-part of Ser. No. 386,189, Aug. 6, 1973, Pat. No. 3,969,601.

[51] Int. Cl.$^4$ .............................................. B23K 9/04
[52] U.S. Cl. ................................. 219/76.13; 219/76.14
[58] Field of Search .................... 219/76.13, 76.1, 76.14

[56] References Cited

U.S. PATENT DOCUMENTS

| | | | |
|---|---|---|---|
| 3,098,150 | 7/1963 | Inoue | 219/76.13 |
| 3,277,267 | 10/1966 | Blaszkowski | 219/76.13 |
| 3,832,514 | 8/1974 | Antonov | 219/76.13 |

*Primary Examiner*—Clifford C. Shaw
*Attorney, Agent, or Firm*—Terry M. Gernstein

[57] ABSTRACT

A device and method for surfacing a workpiece establishes a controlled electrostatic potential between an electrode and a workpiece then establishes a spark arc to melt a portion of the electrodes. The electrode is moved prior to any significant current heating of the workpiece and to extinguish the spark arc. The electrode is then moved into contact with the workpiece prior to solidifying of the electrode to deposit some of the electrode onto the workpiece.

47 Claims, 11 Drawing Figures

DEVICE AND METHOD FOR SURFACING A WORKPIECE

CROSS REFERENCE TO RELATED APPLICATIONS

This application is a continuation-in-part of copending application Ser. No. 900,245 filed Apr. 26, 1978, now abandoned which was a continuation of Ser. No. 721,831 filed Sept. 9, 1976, now abandoned which was a continuation-in-part of Ser. No. 550,824 filed Feb. 18, 1975; and a continuation-in-part application of Ser. No. 332,216 filed Feb. 13, 1973 which resulted in Patent No. 3,878,351 dated Apr. 15, 1975; and Divisional application of Ser. No. 451,059 filed Mar. 14, 1974 which was abandoned; and application Ser. No. 130,734 filed Apr. 2, 1971 which was simultaneously abandoned with the acceptance of copending continuation-in-part application Ser. No. 386,189 filed Aug. 6, 1973 which resulted in a Patent No. 3,969,601 dated July 13, 1976. All rights of priority based on said applications are hereby asserted and claimed.

TECHNICAL FIELD

The present invention relates in general to treating of materials, and, more particularly, to surfacing of metal workpieces.

BACKGROUND ART

Surfacing is the deposition of filler metal on the surface of a base metal. Its purpose is to provide the properties or dimensions necessary to meet a given service requirement. There are several types of surfacing. They may be categorized as cladding, hardfacing, buildup, and buttering. The desired properties, in the same order are corrosion resistance, wear resistance, dimensional control, and metallurgical needs.

Cladding is a relatively thick layer of filler metal applied to a carbon or low alloy steel base metal for the purpose of providing a corrosion-resistance surface when that surface is to be exposed to a corrosive environment. Hardfacing is a form of surfacing that is applied for the purpose of reducing wear or abrasion, impact, erosion, galling, or cavitation. Buildup, as it is normally used, connotes the addition of weld metal to a base metal surface, the edge of a joint, or a previously deposited weld metal for the restoration of the component to the required dimensions. Buttering also connotes the addition of one or more layers of weld metal to the face of the joint or surface to be welded. It differs from buildup in that its use is for metallurgical reasons, not dimensional control. Buttering is used especially when joining dissimilar metals and also for joining carbon steel to a low alloy steel when stress relief of the completed weld is to be avoided. The buttered member can be heat-treated after buttering, or it can be left in the as-welded condition.

Surfacing is often used to improve, update, repair or rework a part so it will have properties equal to or in excess of the original part. In many cases, special problems and considerations are necessary for surfacing. For example, the chemical composition and mechanical properties of the surfacing material may be quite different from those of the workpiece on which it is deposited and a relatively large area of the workpiece is covered in surfacing. If the surfacing uses small amounts of material, there may be a large gradient in alloy and carbon content and mechanical properties across the fusion line between the base metal and the surfacing metal.

Furthermore, dilution, as expressed as a percentage which is equal to the amount of workpiece metal melted divided by the sum of the filler material and workpiece material, the quotient of which is multiplied by 100, may also be an important consideration in surfacing.

In addition to these special requirements, there are many other problems which must be dealt with in a surfacing process. The process should be accurately controllable to be predictable so that known, uniform deposition layers can be produced. Furthermore, the process should not be dangerous to the operator or to others in the vicinity nor should it endanger the workpiece being surfaced. This is an especially important requirement for delicate or small workpieces such as small thin wires, ball bearings or the like, and is also important if the surfacing process is to be amenable to correcting defects in other surfacing processes. In addition to the above, to be entirely effective, the surfacing process should be expeditious and economical and capable of being carried out inhouse. This last requirement is best satisfied by a process which requires a minimum number of steps yet is adaptable to use in a variety of situations to provide a surface which is proper for the workpiece and use expected for that workpiece. Furthermore, from a metallurgical point of view, the composition and properties of surfacing are strongly influenced by the dilution obtained.

In the past, most surfacing has been done using one of the consumable electrode arc welding processes such as disclosed in U.S. Pat. No. 3,184,578. Because of the importance of dilution, it is necessary that the effect of each consumable electrode arc welding variable be known. Many of the welding variables that affect dilution and, therefore, require close control in surfacing are amperage, polarity, electrode size, electrode extension, pitch, electrode oscillation, travel speed, position of workpiece, contamination, and the like. Control of all of these variables may be difficult and, if not properly carried out, undesirable results may be produced.

As welding requires some means for heating or pressing materials to produce a coalescence of those materials, such process has many problems. For example, the heating required may establish severe thermal stresses which may warp or damage the workpiece, and damage the surface produced. The success of a surfacing application sometimes depends upon the magnitude of the internal stresses and whether or not the external stresses are shear, tensile, or compressive. Residual stresses from the welding operation may add to or oppose any stresses encountered in service and, thus accentuate or increase any tendency of the surfacing to crack. Such damage may require further processes or operations to correct. This is especially troublesome if the workpiece is small or delicate. Furthermore, the heating processes may be dangerous to the operator or others in the vicinity and may have to be carried out in a carefully controlled environmental under carefully controlled conditions.

Due to the various problems associated with welding, a particular type of welding process is not versatile and should only be applied in specific situations with specific workpieces. For this reason, there is a wide variety of welding processes, such as arc welding, solid state welding, resistance welding, soldering, and brazing available. Even within these overall catagories, there are numerous types of processes available, such as atomic hydrogen welding, bare metal arc welding, carbon arc welding, cold welding, diffusion welding, flash welding, plasma arc welding, arc brazing, percussion welding, electron beam welding, laser beam welding, and the like. While it may appear to be desirable to have such a wide variety of processes available, such variety is indicative of the non-adaptability of the welding process itself. Such non-adaptability may result in economic and manufacturing problems for a surfacing process.

In addition to the above problems with welding processes in general, an arc welding process in which an arc is used as the means for heating the materials, has additional problems of being essentially an unknown quantity. The characteristics, mechanisms, laws and phenomena associated with arc welding are not fully understood. Therefore, it is difficult to predict ahead of time, what the exact result of an arc welding process will be, and the unknown characteristics of arc welding make it difficult to apply it in a wide variety of situations as it must be carefully controlled in each application. Thus, it is possible to apply too much power and thus damage the workpiece, or too little power and perform an inadequate surfacing process, among other problems. An inadequate surfacing process may be a problem in many situations, but is is also unacceptable in other situations, such as would occur in a food can equipment surfacing situation. Furthermore, the high temperature of a welding arc creates special problems as discussed above with certain workpieces. An arc is also dangerous to people in the area, and may be a source of pollution and be wasteful of energy.

Therefore, welding process for surfacing workpieces have many drawbacks.

To avoid the major problems associated with welding in particular, and with the thermal stresses established in the workpiece in particular, but still obtain the advantages of welding, the welding process has been modified in some surfacing applications. Thus, processes such as spark electrodeposition have been developed. This process of metal transfer by short duration electric discharge applied repetitively at a high rate has been known for a long time. In a spark electrodeposition, a spark discharge is employed which is effected when a electrode is brought into and/or out of contact with a metallic surface to be treated, with a brief electrical impulse applied between them which is of an intensity sufficient to effect localized heating of the relatively small discharge-impinging area, and, by sweeping such contact discharge over a selected surface region of the workpiece, a metallurgical modification or hardening of this elected surface area is obtained. Both electrode and workpiece are conductive and form the terminal poles of a direct current power source. Linear vibration of the electrode is commonly used to provide relative motion between the two poles. It is typically achieved by mounting the electrode to the armature of a solenoid. Typical operation of such a solenoid is 120 cycles per second. Alternate motions of the electrode have been attempted, including rotation of the electrode about its axis and combinations of rotation and linear vibration to provide intermittent contact with the surface, thereby causing repetitive electrical discharges.

The individual discharges through the electrode must be of short duration (less than 100 microseconds) and the energy level at 0.01 to 4 joules for material transfer to satisfactorily occur. A condition known as arcing occurs when the electrical discharge is of low intensity and long duration. Duration of the spark during arcing can be of a magnitude of one hundred times longer than is desirable for spark deposition purposes. It therefore becomes very desirable to minimize the duration of the spark while maintaining the selected energy level for proper deposition.

The actual mechanism involved in material transfer by electrodeposition is subject to speculation. However, it is usually assumed that due to the spark itself or to the $I^2R$ heating associated therewith, a gas bubble forms about the spark discharge and persists for a time longer than the area adjacent to the spark itself. Metal in either the electrode and/or the workpiece melted due to the high temperature is transferred from the electrode to the workpiece surface via the expanding gas bubble. This theory has the electrode tip cooling before the workpiece and being drawn away to break the weld thus formed and leave material from the electrode tip deposited on the workpiece. Generally, maximum material transfer is made by moving the electrode over the workpiece and by making the electrode the anode and the workpiece surface the cathode of the discharge circuit. Another reason for providing relative motion between the electrode and workpiece is the need to continually fracture the adhesive junctions forming as the electrical discharge occur and the molten metal deposits and solidifies.

However, while avoiding the severe thermal stresses often associated with bulk heating of the workpiece in the above-mentioned welding processes, the spark treatment processes still require heating, albeit local heating, of the workpiece. This situation may be acceptable in many applications, but in small, delicate parts, even localized heating of the workpiece to melting temperature may be unacceptable. Furthermore, in some situations, the sparks can be dangerous to personnel in the area, this may be especially true in the situation where the spark carries material from the electrode to the workpiece. Such situations can come very close to being a pulsed arc technique and thus be subject to the above-discussed welding associated problems. As mentioned above, a full understanding of the spark electrodeposition principles and theory is not available. Therefore, like welding, spark electrodeposition is also subject to problems associated with this lack of understanding.

Examples of the spark electrodeposition process are disclosed by Antonov in U.S. Pat. No. 3,832,514, Balskowski in U.S. Pat. Nos. 3,360,630, 3,277,267, and Inoue in U.S. Pat. No. 3,098,150. The Blaskowski and Inoue patents use electrode-surface contact to establish an intense localized current heating of the surface for producing the coalescence of materials mentioned above. The Antonov process maintains an electrode spaced a definite distance from the work surface and maintains a spark arc to deposit material on that surface. This arc will be established by a potential high enough so material can be transferred by the arc. In all of these processes, significant heating of a small workpiece may occur. In Blaskowski and Inoue, the current heating, even though local, will occur and could endanger small elements; and in Antonov, the material-transporting spark arcs will have enough energy to heat the workpiece in a manner similar to welding arcs. In addition, the Inoue technique may require a rather substantial impact to be delivered to the workpiece and the Blaskowski process may only treat a small upper layer of the workpiece surface. The Antonov process is not as severe as arc welding but due to the use of a material-carrying arc, it is similar enough to such technique to be subject to the above-discussed problems and drawbacks associated with welding, especially if used on small workpieces. Certain variables in the Antonov technique can be changed in much the same manner as the aforediscussed welding variables of amperage, welding speed, and the like. However, the Antonov variables are changed within the context of the arc welding type operation being performed and even though electric potential for example is altered, it cannot fall below a value sufficient to establish a material-carrying spark arc. However, even such a low energy material-carrying arc will cause heating of the workpiece which may be significant enough to endanger a small item.

Other examples of spark electrodeposition are disclosed by E. H. Thorton and R. G. Davies in an article in "Metals Technology" copyrighted 1979 by the Metals Society, 1 Carlton House, Terrance, London SWIYSDB, and U.S. Pat. Nos. 3,097,291, 3,098,150, 3,316,381, 3,617,680, 3,741,426, 3,969,601, 3,524,596, 3,614,373 3,415,971 3,415,970 4,098,477 4,205,211 and 4,292,494 as well as British Pat. No. 756727, Japanese patent specifications 32-9998 issued Nov. 29, 1957, 32-599 issued Jan. 29, 1959, 32-2446 issued Apr. 19, 1959, 32-2900 issued May 16, 1959 and 32-6848 issued Aug. 28, 1959.

In all of the above mentioned processes, the associated heating of the workpiece may be significant enough to endanger items like switch relays, razor blade edges or the like. Therefore, known spark electrodeposition processes have many drawbacks which may make them unacceptable for use with delicate workpieces.

Because of these and other drawbacks, other surfacing processes such as thermal spraying, adhesive bonding, vacuum deposition, sputtering, and the like, have been developed in an effort to produce adequate surfacing without the problems associated with welding or welding-type techniques. However, these processes have drawbacks due to the quantity and quality of the finished product and also often produce irregular and unpredictable results as well as porous or weakly bonded coatings, which require further processes to correct. These processes may also be expensive and of limited applicability, and difficult to repetitively apply in-house.

Recently, ion beams have been used to surface treat metals in a pollution-free manner which is suitable for use on small, delicate items. Ion beams can implant microscopic diffusions of other materials into a thin surface layer thereby creating a new compound. Therefore, claddings and ultra-thin coatings are possible. However, surface treating using ion beams may require a plasma of ions which is accelerated by an electric potential of up to 100 kilovolts. Ion beams can be used for plating, or other surface treatments, such as roughening etching or the like. However, such surface treatment may be extremely expensive and of very limited application.

Rocklin in U.S. Pat. No. 3,763,343 discloses a metal treating tool which uses a spark to locally heat and melt the metal surface of the workpiece. The electrode is not consumed and heating is extremely localized and is quickly air quenched so that the heating itself changes the workpiece surface to surface treat that workpiece. This device is inexpensive and is capable of in-house use on small items; however, the electrode is not consumed and the surface treatment is expressly limited to changing surface characteristics only, thereby limiting the use of this tool to roughening or smoothing surfaces only. Therefore, this tool cannot perform surfacing such as cladding, hardfacing, buttering and buildup, or the like which require deposition of material on the surface.

Therefore, there is need for a surfacing process which is different from welding and hence is not subject to the drawbacks of welding or spark treating techniques which require heating of the workpiece, yet which is inexpensive and produces a well-bonded surface coating to small, delicate items.

DISCLOSURE OF THE INVENTION

It is a main object of the present invention to provide a novel process for surfacing a metal workpiece which does not require the metal to be heated.

It is another object of the present invention to provide a novel metal surfaing process which is useful in surfacing small or delicate items.

It is another object of the present invention to provide a novel workpiece surfacing process which is inexpensive, predictable and produces well bonded surfaces.

It is another object of the present invention to provide a novel metal surfacing technique which is controllable so it can be used to accurately surface in a wide variety of processes.

It is another object of the present invention to provide a novel surface treating technique which is safe, energy efficient, and essentially pollution-free.

It is another object of the present invention to use controlled electrostatic potential in a surfacing technique.

It is a specific object of the present invention to provide a novel electrodeposition surfacing technique in which a spark is generated to heat an electrode tip, but does not need to melt the metal being surfaced in order to accomplish the surfacing of that metal workpiece.

It is another specific object of the present invention to provide a novel electrodeposition metal surfacing technique in which the potential used to generate a spark for heating an electrode tip is accurately controllable so the amount of electrode tip heating is accurately predictable.

It is another specific object of the present invention to provide a novel surface treating technique which can be used on items such as small thin wires, diodes, razor blade edges, switch relays, ball bearings, food can equipment, and which can also be used to correct thin defects in surfaces produced by other processes.

These and other objects are accomplished by the method and apparatus for surfacing a metal workpiece embodying the present invention. An electrode is located at a prescribed distance from the surface of a metal workpiece and an electrostatic potential is established between the electrode and the workpiece, with the electrode being the anode and the workpiece being the cathode. This potential is maintained to be approximately equal to that potential associated with glow discharge. For purposes of this disclosure, glow discharge is defined as the electrostatic condition existing between two conductive elements immediately prior to a spark discharging from one of those elements to the other. Thus, for example, an electrostatic potential corresponding to an energy level of just less than the above-mentioned 0.01-4 joules will be a glow discharge situation. In glow discharge conditions, the air located between the elements becomes charged due to the electrostatic charges existing on the elements, and occasionally, a faint hissing noise may occur. The existence and maintenance of a glow discharge situation will therefore depend upon the elements and the dielectric material (usually air) located between such elements. Reference can be made to texts, such as "Lightening" by Martina. Uman, Library of Congress, Catalog No. 68,8036 or other standard Physics textbooks for disclosure necessary to set exact conditions for a particular situation to establish glow discharge. The electrode is then moved into contact with the surface of the metal and quickly moved away to establish a spark arc prior to any significant current heating of the electrode or the workpiece. The spark arc will melt the workpiece and the electrode, but the workpiece will be melted in such a minute area, that is only the area where the spark arc contacts that element, that no significant bulk or localized or nonlocalized heating of the workpiece will occur. Any molten metal of the workpiece will be quick-air quenched in the manner of U.S. Pat. No. 3,763,343, but the electrode tip will be subject to slightly higher heat transfer due to its being the anode and of smaller area than the workpiece. The area of spark arc contact on the electrode thus remains molten longer than that arc contact area on the metal workpiece. The electrode is moved to a location in which the arc is extinguished, and then quickly moved back into contact with the metal workpiece prior to the molten portion thereof solidifying. This molten portion of the electrode is thereby deposited onto the workpiece. The electrode is then withdrawn to begin the process over again. Very small amounts of material will be deposited but this condition is desirable for small items. The electrode material depositing contact can occur at the location of initial contact or at another location as desired. The conditions necessary for glow discharge can be varied according to the existing conditions at the selected location on the workpiece, and can be varied to establish slightly higher energy spark arcs if this is suitable for the particular workpiece being surfaced, but will always be less than the electric potential associated with arc welding. The electrode is vibrated at a frequency necessary to contact and then re-contact the workpiece prior to solidifying of the portions thereof melted by the spark arc, and this vibrational frequency is set according to the distance used to establish glow discharge, and to extinguish the arc plus the solidifying time of the electrode. Electrode movement across the metal surface is therefore controlled by the period of this vibrational frequency. The electrode can be rotated if desired.

BEST MODE FOR CARRYING OUT THE INVENTION

The process for surfacing a metal workpiece embodying the present invention is shown schematically in FIGS. 1A-1F. A controlled electrostatic potential is used to generate a spark arc that is controlled so a process of depositing material onto the surface of a small or delicate workpiece can be economically carried out without significant thermal stresses being established in the workpiece.

Figure 1A:
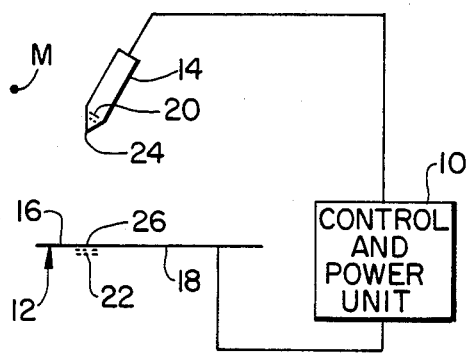
FIGS. 1A-1F are schematic representations of the steps used in surfacing a small or delicate workpiece according to the present invention.

As shown in FIG. 1A, a control means and controlled power unit 10 is connected to a workpiece 12 and to an electrode 14. The electrode is positioned and moved with respect to surface 16 as indicated by the diagrams M in FIGS. 1A-1F in order to deposit electrode material on the surface at location 18. The parameters associated with position of the electrode and power from unit 10 are controlled so that controlled electrostatic forces 20 and 22 are respectively established in the electrode tip 24 and in the workpiece at location 26 for use in surfacing the workpiece.

Figure 1B:
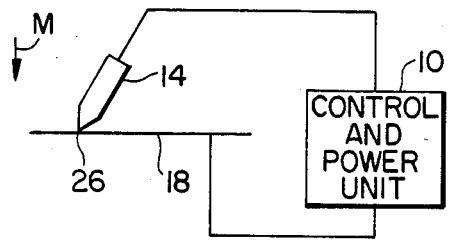
Figure 1C:
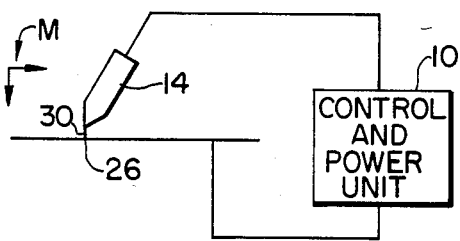

The process is begun by positioning the electrode 20 with respect to the workpiece surface so that the electrostatic potential between electrode tip and the workpiece at location 26 is equal to a glow discharge condition in the FIG. 1A position. The electrode is then advanced into contact with the workpiece at location 26 and then is quickly withdrawn to draw a spark arc 30 between the workpiece location 26 and the electrode tip as shown in FIGS. 1B and 1C. The electrode is then moved to a FIG. 1D position in which the spark arc is extinguished. The above-mentioned parameters are controlled during these steps so that no significant current flows between the electrode and the workpiece during the contact shown in FIG. 1B. In this manner, the only heating of the workpiece will be caused by the spark arc itself. This heating will occur at an extremely limited area of the workpiece and will be so slight that quick-air quenching occurs at location 26. The action occuring at location 26 thus far described corresponds to the surface treatment disclosed in U.S. Pat. No. 3,763,343, and no surfacing occurs at location 26.

Figure 1D:
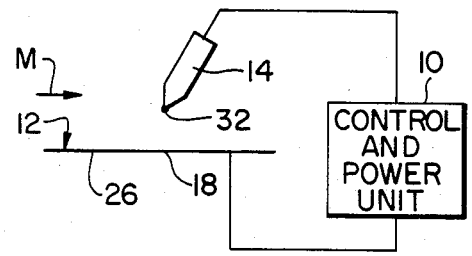
Figure 1E:
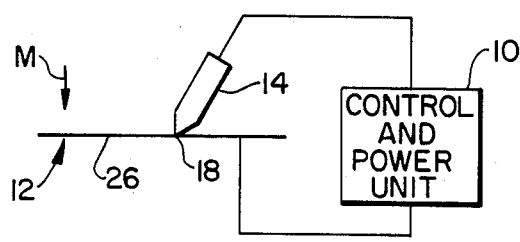

The parameters are controlled so that the spark arc has enough energy to melt a portion of the electrode tip 24 which is the anode and has a vary small area so that a spark arc can melt the tip 24 without significantly heating the workpiece at location 26. The melted electrode tip portion 32 is best indicated in FIG. 1D. The electrode is then quickly moved from location 26 toward location 18 on the workpiece as shown in FIGS. 1D, then into contact with the workpiece at location 18 as shown in FIG. 1E. The sequence of movement shown in FIGS. 1C, 1D and 1E is adjusted and the power from unit 10 is adjusted in a corresponding manner so that the spark arc is established and extinguished and the electrode moved into contact with the workpiece at location 18 prior to the melted portion 32 of the electrode tip solidifying. Power from control unit 10 can be adjusted of shutoff during this interval so that no spark arc is established at location 18 during the deposition of melted electrode material onto the worksurface in the configuration shown in FIG. 1E. The electrode is then withdrawn from contact with the workpiece leaving a small deposit 34 on the workpiece at location 18. If suitable, the location 18 can be then used as the initial location for a subsequent surfacing process. In other words, the location 18 from the just-described process can correspond to location 26 for a subsequent process. The amount of melting of the electrode tip can be controlled by adjusting the electrostatic potential established in the FIG. 1A configuration within the confines of the process. That is, the electrostatic potential is increased if more tip melting is desired, but held to a value less than that potential associated with a welding process when the welding electrode is in a position corresponding to the position shown in FIG. 1A for the elements used in the present process. The amount of tip melting can also be controlled by the selection of the electrode and workpiece materials.

The spark arc 30 and the result thereof will be quite predictable and safe and the electrode tip will cool quickly thereby rendering it safe to use as well. Due to the low energy associated with the spark arc, it will not generate dangerous radiation and will be more easily controlled than a high energy spark arc. Due to the minute area of contact between the spark arc and the workpiece, no significant heating of the workpiece occurs thereby essentially eliminating thermal stresses from the process.

Figure 1F:
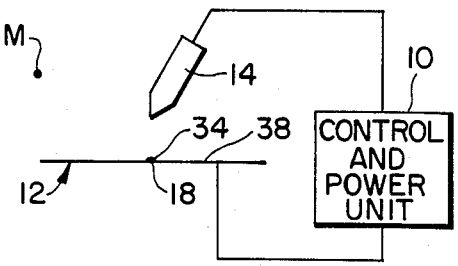

The electrostatic potential can be a function of workpiece material, electrode material, amount of melting desired as well as position of the electrode relative to the workpiece. Thus, for example, if a third location 38 in FIG. 1F is to be specially surfaced, the position 18 can be used to establish an electrostatic potential different from that potential associated with location 26 so a spark arc established between the electrode tip and the workpiece at location 18 will melt a different amount of material on the electrode tip than spark arc 30 established at location 26 will melt. The time delays associated with movement of the electrode between the positions shown in FIGS. 1A, 1B, 1C 1D and 1E can also be adjusted so a deposit at location 38 will differ from deposit 34 at location 18. The electrode can also be rotated during the process if suitable.

Figure 2:
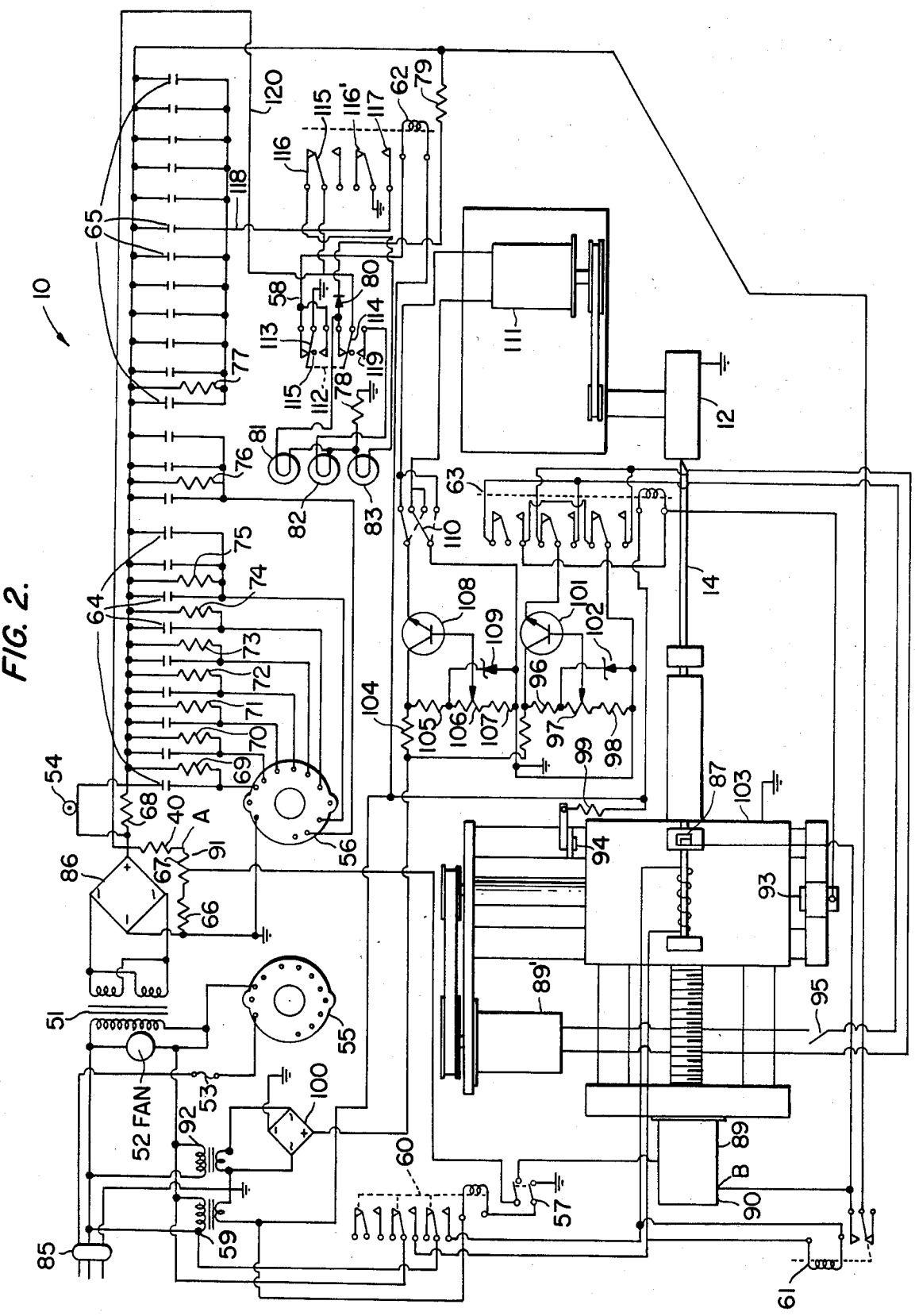
FIG. 2 is an electrical schematic diagram of the components used in performing the surfacing method of FIGS. 1A-1E.

Shown in FIG. 2 is a schematic of the power unit 10. The power unit 10 uses a balanced resistor method of actuating various drive mechanisms powered by motions of the equipment. While FIG. 2 depicts the electrical circuitry and shows the apparatus and method in a system of automatically applying one metal to the surface of another, it can be performed manually as well. The term "automatic" refers jointly to feeding the electrode toward the workpiece, or automatically to compensate for electrode wear. It also shows alternate methods of adjusting the electrode to treat variations in the contour in the surface of the workpiece. It also shows a means of retracing the electrode away from the work piece should the electrode become completely shorted out against the rotating workpiece. These adjustments cover all workpiece angles and sides. FIG. 2 also shows a means of automatically moving the electrode laterally to coat a larger work surface rather than being confined to coating the workpiece restricted to just the width of the electrode.

The unit 10 includes an electronic capacitance and relative power supply fundamentally including: a transformer (51), a fan (52), a fuse (53), an activation indicator (54), a power switch (55), a capacitance switch (56), a vibrator, arc, and horizontal motion drive switch (57), a range switch (58), a transformer (59), relays (60, 61, 62 and 63), a capacitor bank (64 and 65), resistors (66–79), a diode (80), neon indicating lamps (81, 82 and 83), a vibrator (84), electrode (14), workpiece (12), and plug (85).

The neon work light (54) indicates proper arcing of the electrode, and can be used as follows:

I. Use of the light (54) in FIG. 2 which provides the visual spark activation indication of the electrode action, which has the capability to cause with proper electrical circuit arrangement, various results important to the automatic motion potentials and other circuit adjustments.
 (a) When the light is dark, no contact of the electrode is made with the workpiece.
 (b) When the light is bright, it indicates the electrode is shorted out in contact with the workpiece.
 (c) When the light is blinking, it shows proper arc working action. The light can be of many types, such as: light through electrical circuitry, time delay photo cell receivers, relays, switches, etc. coupled with various optical-electrical circuitry and mechanical devices to perform many functions inherent in this invention.

II. The vibrator shown as (84) in FIG. 2 is shown operating the electrode at a fixed actuation frequency. Various means of mechanical or electrical, or these with combinations, can be used to change the method of actuation of the electrode such that the electrode can be activated in various forms of motion and at various frequencies of motion and forms. The electrode motion can be reciprocal, rotary, oscillatory, intermittent, vibratory, or there can be no motion at all if desired.

Plug (85) is a standard three-prong A.C. plug with one pin being at ground potential while 117 volts A.C. is applied to the two remaining pins. One side of the A.C. line is fed through the fuse (53) then to switch (55). Switch (55) is the main power supply switch for the system. When switch (55) is closed, 117 volts A.C. is fed to the fan (52) and the transformer (51). The fan is to cool the power resistors (68) and (79). Transformer (51) is a step down transformer which steps the line voltage down to 60 volts A.C. This 60 volts is applied to a bridge rectifier (86) which in turn supplies D.C. to the two sets of banks of 12 capacitors, such as noted capacitor banks (64) and (65), through the power resistor (68). Resistor (68) limits the current from the bridge rectifier (86) to approximately four amperes (for certain work purposes). The negative side of the bridge rectifier is fed to switch (56) which cumulatively adds the 12 capacitors noted as the bank of capacitors (64) to the output of the bridge rectifier. This system has three ranges of output controlled by switch (58). When the switch (58) is in the upper position (high) it energizes the coil of relay (62) which causes the relay to pull in. This connects the power resistor (79) in parallel with resistor (68). The maximum current draw from the bridge rectifier (86) is then for other certain work purposes approximately eight amperes. When switch (58) is in the lower (medium power) position, resistance (79) drops out, hence the capacitors in bank (65) are still in the circuit but resistance (79) is removed. The net results are that the added capacitance from bank (65) remains in the circuit on the medium setting but the current draw is reduced to approximately four amperes for certain work purposes. When switch (58) is in the middle (low power) position, relay (62) drops out taking the capacitance bank (65) out of the circuit. Resistance (79) remains out of the circuit. Therefore, the current draw remains at approximately four amperes but the total capacitance is reduced for certain work purposes. In each of the three settings the appropriate lamp (81), (82), or (83) will light up indicating the position of switch (58) as to high, medium, or low output.

The primary of transformer (59) is connected to the A.C. source after switch (55). The transformer (59) has a 6.3 volt A.C. secondary which is used to activate relays (60), (63), and (62). When switch (57) is closed, it activates the coil of relay (60). This provides activation of coil of relay (61) and the vibrator (84) with 117 volts A.C. This activates relay (61) connecting the electrode (14) through connection (87) with the positive D.C. output of bridge rectifier (86) through resistors (68), (69), (70), (71), (72), (73), (74), (75), (76), (77), (78), and (79). Since the electrode is vibrating and is charged positively and the workpiece is at ground potential, they will arc causing the electrode (14) to metal and to be in arc position with respect to the workpiece (12).

The unit 10 also includes a horizontal feed means to maintain a predetermined gap between the electrode and the workpiece. Should the electrode come too close to the workpiece, or too far away, the horizontal feed must compensate and reposition the electrode.

The horizontal feed means includes resistors (66), (67), (68), (76), (79), and (88), relay (60), switch (57), and a motor (89). Since the electrode to ground voltage is proportional to the electrode to workpiece is gap distance, this is what is used to maintain the correct gap distance between the electrode and the workpiece. The resistance (66 and 88) are fixed and resistor (67) is variable and form a voltage divider network. Resistor (67) includes a movable arm connected to switch (57) of which the other side is connected to the horizontal drive motor (89). The other lead of the motor is connected to the output of bridge rectifier (86) through resistor (68). The values of the voltage divider network are such that when the voltage between the electrode and ground is a predetermined voltage providing a good arc for certain work purposes, the voltage between points A (91) and B (90) is zero. When the electrode distance between the electrode and workpiece increases and hence the potential increases between the two, B point 90 becomes positive with respect to A point 91 supplying voltage to motor (89) which drives the electrode closer to the work. When the electrode becomes too close to the workpiece, the potential difference between the two decrease and point (90) becomes negative with respect to point (91) which reverses the polarity of the voltage supplied to motor (89) thus reversing it. Motor (89) then drives the electrode away from the workpiece until the zero voltage level is again reached.

A lateral feed section of the unit (10) includes a transformer (92), motor (89'), relay (63), stops (93) and (94), a switch (95) resistors (96, 97, 98 and 99), a bridge rectifier (100), a transistor (101), and zener diode (102).

Transformer (92) has its secondary feed to bridge rectifier (100). This D.C. voltage has the voltage divider network formed by resistors (96, 97 and 98), which is used to bias transistor (101). Resistor (97) is variable and allows the output from the transistor to be varied between zero and a predetermined value with respect to ground. This variable voltage is used to drive motor (89'). Stops (93) and (94) have the purpose of reversing motor (89') when either of the stops makes contact with a grounded electrode carriage (103). First, if the electrode carriage (103) is moving in the direction of stop (93) under the power of motor (89'), the motor will be reversed when contact is made with (93). When the electrode carriage (103) touches the contact of the stop control (93), this control is grounded and relay (63) is energized and pulls in reversing the polarity to motor (89'). When the electrode carriage (103) travels across and strikes a contact of stop (94), this shorts out the relay coil through resistance (99) causing the relay (63) to drop back out. This again reverses the polarity to motor (89') driving the electrode carrige (103) back toward contact stop (94). This action will continue until manually stopped.

A rotary feed means includes transformer (92), resistors (104, 105, 106 and 107), a transistor (108), a diode (109), a switch (110), and a motor (111). Transformer (92) supplies A.C. voltage to bridge rectifier (100) which in turn supplies D.C. voltage to the voltage divider network formed by resistors (105, 106), and (107) which is used to bias the transistor (108). The resistor (106) is variable and is used to vary the output of transistor (108) in respect to ground. This variable D.C. voltage is used to drive motor (111), which rotates the workpiece. Switch (110) is a three-position switch used to stop or reverse the direction of motor (111).

Three different capacity outputs of the electrical circuit are arranged for varying work result requirements by means of three ranges of output. Operation of high, low and medium power switching: range switch (58) is a three-position switch—high position (contact), middle position (no contact), and bottom position (contact). Connector 112 mechanically connects contact arms (113) and (114), but they are electrically isolated.

In the low (center area of switch) position, the switch contact arms (113) and (114) make no contact. Therefore, relay (62) is not energized. Arm (115) and pole (116) are thus engaged which motivates the low light (83). In a low position, only capacitor bank (64) is used. The negative power of this is transmitted through capacitive switch (56).

In a medium position, range switch (58), is in the medium or bottom position. Contact arm (113) and arm (115) (connected bottom contact) are in contact. This energizes relay (62), and a contact arm (116) and a pole (117) touch. This causes capacitor bank (65) to charge through line (118) to ground. Arm (114) and a pole (119) of range switch (58) are also in contact with lights (82).

In a high position of the range switch, contact arm (113) and pole (115) touch. This energizes relay (62) and contact arm (116') and pole (117) touch causing capacitor bank (65) to charge through line (118) to ground. Arm (114) and pole (112) touch which lights lamp (81).

Resistor (79) is caused to parallel resistor (68) through line (120) by contact arm (113) and the pole of switch (58). This gives an electrical resistance equivalent of the parallel resistances. Thus, more current flows to the electrode.

Diode (80) prevents high lamp (81) from receiving positive D.C. through resistor (79) and thus prevents this lamp from lighting when not in a high position.

Figure 3:
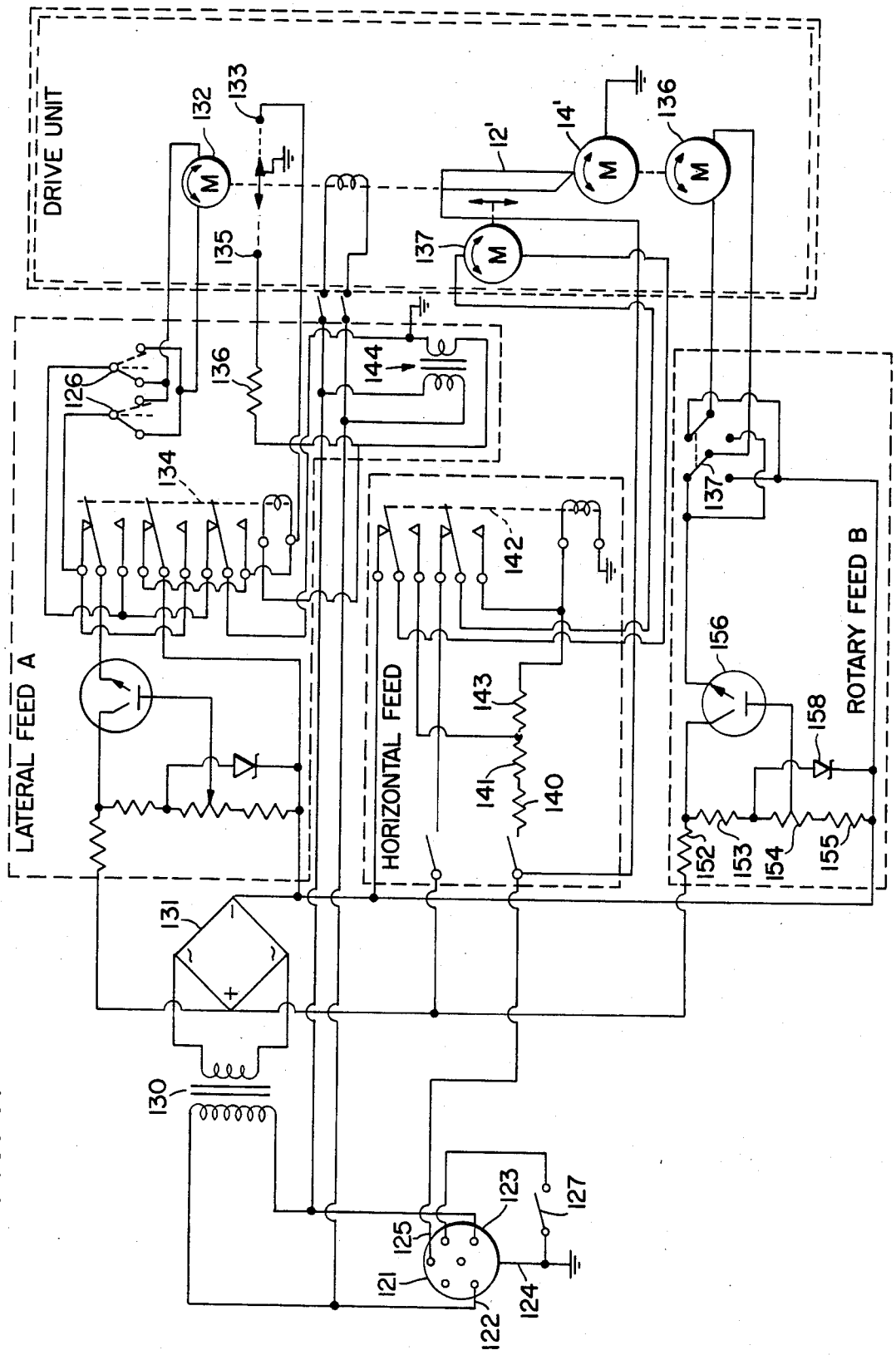
FIG. 3 is a schematic diagram of the electrical components used in a feed and drive control system associated with the process of the present invention.

FIG. 3 shows a drop out relay method of actuating various drive mechanisms powering motions of the equipment. This drawing depicts the electrical circuitry and shows the apparatus and method in another system of automatically applying one metal to the surface of another. It has variations of actuation differing from the methods shown in FIG. 2. FIG. 2 shows a motor and method of activation by electrical means of utilizing balanced resistors. FIG. 3 shows a means which utilizes another electrical means and method of accomplishing similar results by means of drop out relay activation for electrically operating the apparatus and method of application.

For brevity, the electrical charge generation from the bank of capacitors and its generation means relating to the control of the quantity and quality of the discharge spark emission is left out of disclosure, relating it to a connector plug (121).

In the connector plug (121) of this FIG. 3, elements (122) and (123) represent the A.C. power source from the plug (85) in FIG. (2). Element (124) is the ground terminal from the A.C. power referenced plug (85) in FIG. 2. Element (125) is the power outlet connection of the positive charge generation provided by the bridge rectifier (86) after it has passed resistance 68 and the bank of condensers (64), and (65) (if utilized) of FIG. 2, which charge is designed to be emitted by means of the spark omission from the electrode.

Briefly, in FIG. 3, the various motor electrical circuits are separately outlined in Section A as LATERAL FEED which components activate the electrode carriage shown as (103) in FIG. 2, whose side to side motion causes electrical contact with contact points (93) and (94) shown in FIG. 2 which correspond to element (126) of FIG. (3).

Also briefly, the rotary motion of the workpiece is activated by the outlined Section B of FIG. 3 referring to the motor control for the rotation or activation of the workpiece 14'.

The horizontal feed outlined segment of FIG. 3 referring to the electrode activation is more completely described as it relates to the activation of the drop out relay process approach and method.

The spark generation control unit is electrically connected to the connector receptacle (121) of the spark generator mentioned above. When a switch (127) is closed, the control unit is suppled with 117 VAC at elements (122) and (123) on the connector receptacle (121) and also the arc voltage between points (124) and (125) on the receptacle.

The power from the receptacle is supplied to a transformer (130) which supplies a bridge rectifier (131) with a predetermined power. The output of the bridge (131) is used to supply the variable motor drive circuit outlined as "A" which drives a motor (132). The motor (132) is used to move the electrode across the surface of the workpiece.

The housing which holds the electrode is at ground potential. There are two contacts, one positioned on either side of the electrode housing. As the electrode 12' moves across the workpiece and reaches the outer edge, the housing will make contact with a contact (133) which is positioned at this particular point. Since the electrode housing is grounded it will ground one side of a relay coil (134) which will pull the relay in and reverse the motor so the electrode will travel back across the workpiece as the electrode approaches the center of a rotating workpiece, the electrode housing will touch a contact (135). This will short out the relay coil through a resistor (136) causing the relay (134) to drop out and reverse the motor and cause the electrode to travel back across the workpiece again. This process will continually repeat itself until manually stopped by means of the switch (126) which can also be used to manually reverse the motor (132).

The bridge rectifier (131) also supplies power to the variable motor drive circuit outlined as "B" which drive a motor (136). Motor (136) rotates the workpiece and is reversible by means of a switch (137).

The horizontal drive maintains the correct distance between the electrode and the workpiece. If the electrode is not making any contact with the workpiece, a motor (137) must drive the electrode toward the workpiece. If the electrode is arcing properly on the surface of the workpiece, the motor (137) must hold the electrode at this distance. Should the electrode come in direct contact with the workpiece so there is no arc, the motor 137 must drive the electrode back until it is arcing properly with the workpiece once again.

This oscillating action is obtained by a resistance network between the electrode and the workpiece which is at ground potential. When the potential between the ground and the electrode is at maximum the values of resistors (140) and (141) are such that there is a power available at the coil of a relay (142) and a potential across a resistor (143). Since there is a predetermined amount of potential available at a relay coil (142), the relay pulls in connecting the motor (137) across the resistor (143). The polarity is connected so that the motor (137) will drive the electrode toward the work. When the electrode begins to arc against the workpiece the voltage across the resistor (143) will decrease, which in turn will drive the motor (137) more slowly. When the motor (137) is completely stopped, the relationship between the electrode and the workpiece is correct. Should the electrode short completely out with the workpiece, the voltage drops across the resistor network (140), (141), and (143) and the relay coil (142) will drop to zero. Therefore, the relay (142) will drop out connecting the motor (137) to the bridge rectifier. The polarity of this is such that the motor (137) will reverse and drive the electrode away from the workpiece, but only until the proper arc has again been achieved. Then, the relay (142) will drop in.

A Rotary Section is outlined in FIG. 3 as "B" and rotates the workpiece such that the surfacing can be evenly applied by the electrode to the workpiece. This section consists of a variable Direct Current supply, a switch (137) to reverse the motor (136) or switch to turn off the motor (136).

The transformer (130) supplies current to the bridge rectifier (131). The positive side of the bridge rectifier is fed to a current limiting resistor (152). Resistors (153, 154 and 155) form a voltage divider network used to bias a transistor (156). A potentiometer is used to vary the bias voltage to the motor (136). A zener diode (158) is used to prevent the transistor from becoming over biased. The variable voltage is then fed to on-off-on switch (137) which is used to reverse the direction of motor (136), or to turn it off.

A Lateral Section is outlined in FIG. 3 as "A" and moves the electrode laterally across the face of the workpiece as the outline ROTARY SECTION "B" rotates the workpiece.

The circuit functions of "A" and "B" are the same, except Section A, instead of having the variable voltage fed to a switch (137) in Section (B), it is fed to relay 134 in Section A.

The purpose of the relay (134) is to reverse the lateral travel of the electrode once it has reached its predetermined farthest desired limits set by the adjustable movable stop contact points (93) and (94) shown in FIG. 2. This is done by having the movable stops positioned as desired on either side of the grounded electrode carriage holder (103) in FIG. 2. This allows all or any part of the workpiece to be treated by the electrode as desired.

When the electrode carriage (103) is operating and the electrode is traveling across the face of the rotating workpiece, and is approaching the contact stop (93) in FIG. 2, contact stop (93) is positioned such that when the electrode reaches the set out limits of the work coverage, the carriage (103) will come in contact with the contact stop (93). When this occurs, contact (93) wll become grounded, which in turn will ground one side of the relay (134). This will reverse the rotation of the motor (132) and begin moving the electrode carriage back across the workpiece. When the electrode carriage breaks contact with the contact stop (93), the relay (134) will not drop out because one side of its coil remains grounded through its contacts. When the electrode carriage travels across to the predetermined adjustable position of stop setting of contact (94) and grounds contact stop (94), this shorts out the relay (134) to drop out and break the contacts, thus reversing the motor. The electrode carriage and electrode will continue to automatically work its way across the work piece until the operator, or a timing arrangement, or switching arrangement stops this process. The purpose of having the motor (132) variable in speed is so that as the Rotary Feed Section B rotates the workpiece, the travel of Section A will be varied according to the work conditions required, or will travel only the width of the electrode or slightly less for each revolution of the motor.

Figure 4:
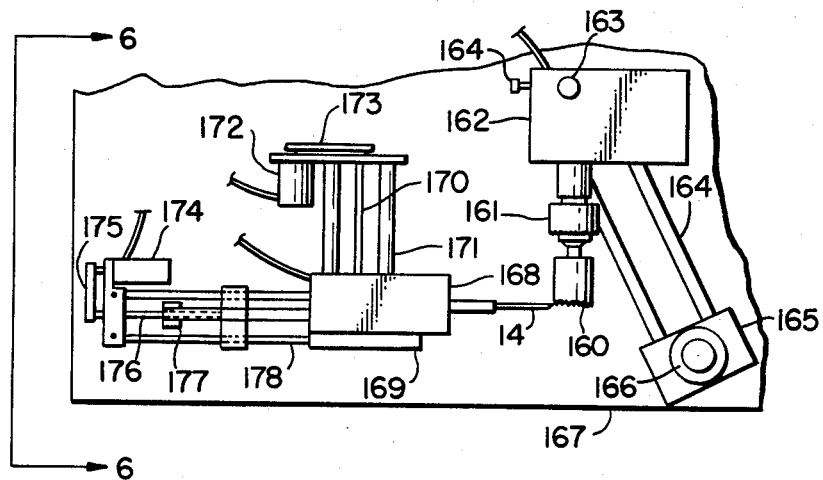
FIG. 4 is a plan view of the mechanical set-up shown schematically in FIGS. 1A-1E as used to surface the teeth of a hole saw.

FIG. 4 is a plan view of the various driving elements and components of the mechanical equipment related to the electrical circuitry of FIG. 2 and FIG. 3 for activation. A workpiece is shown as (160). This workpiece shown is a hole saw, which is rotated by the rotary feed mechanism drive as shown in FIG. 3, Section B, and held in position by a work holder chuck (161). The driving mechanism for rotation is in case (162). Case (162) is pinioned for adjustment rotationally and vertically about pin (163) which has a set screw (164) for anchoring the position of the case of the pin. The case (162) is slidably arranged for adjustment, positioning along the rods (164) which are anchored in a holder (165) which rotates around a pin (166) and an adjustable setting means is utilized to fix the position of holder (165) on pin (166) to anchor this element at the desired position. Pin (166) is anchored in a base (167). Positioned on the base (167) is a Horizontal Feed Case (168) and mounted thereon is a Lateral Feed Case (169). The Case (168) is the case for the mechanism of the lateral carriage shown as (103) in FIG. 2.

The case (168) is the case for the mechanism of the horizontal carriage which holds the electrode and the vibrator (84) shown in FIG. 2.

The lateral feed is arranged through a screw (170) along guide rods (171) and is activated by a drive motor (172) through a belt and pulleys (173).

The horizontal feed positioning the electrode reference to the workpiece is powered by a motor (174) through a pulley and belt (175) to power a threaded screw (176) through to a thread engagement means (177) which propels the electrode holder case (168) along guide bars (178).

To show the variety of work capabilities, not only in round, or cam shaped, or irregular shaped elements are capable of being treated, the hole saw workpiece (160) shows as an example of the capabilities to perform unusual mechanical motions relating to the electrical circuitry for treating the cutting surfaces of this hole saw's many teeth. This hole saw as the workpiece is shown in relationship to the electrode at 90° setting shown. The mechanical adjustment of the relationship of the electrode to the workpiece is altered such that when treating the cutting teeth themselves using a 1/16" tungsten carbide electrode has an angular setting reference to the electrode of approximately 120° setting (not the 90° setting as the side surface treatment is shown). This 120° setting allows the electrode to enter the teeth area from this angle and so treat the teeth edges and gullets. For this work the electrode is slightly tapered at the end but not pointed. The workpiece is rotated counterclockwise from the front.

Electrically when treating the teeth themselves of the hole saw, the lateral feed is in the off position. The charge generator is energized to the desired setting for proper spark emission. The horiziontal electrical feed circuit and the rotary action must be balanced so that the electrode shorts completely out against the point of the tooth so that it does not burn the cutting edge from the tooth while it is traveling in and out of the horizontal guides from one tooth to the next.

Alternates of the above treatment process can be arranged so that the electrode shape can be different and the saw teeth can even be arranged at 180° to the electrode and similarly treated as the electrode will follow the contour of the teeth and meet the face of the cutting edge of the teeth.

There are so many varieties of treatment, actuation and of apparatus for the many varying uses and methods provided that the above for descriptive brievity is intended to show the means of activation and capabilities of all shapes, sizes, methods, electrodes, and utilization of the many purposes afforded for the application of an electrode to a workpiece has its many and varying desired results. As an example, if one were to fuse tungsten carbide onto a round shape hole saw without teeth so that the fused tungsten carbide would act as a cutting agent, it could be similarly accomplished as the applied rough tungsten carbide would act as a cutting agent alone for hole saws. Similarly, this rough edge treatment can be applied to metal surfaces to provide saws, grinding wheels for abrasive machining, etc.

Figure 5:
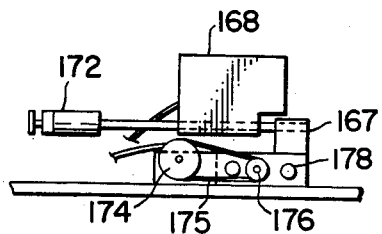
FIG. 5 is an elevation view of a lateral and horizontal drive mechanism used in the surfacing method of the present invention.

FIG. 5 is an elevation view of the lateral and horizontal drive mechanism relationship of FIG. 4 and shows its methods of movements.

Figure 6:
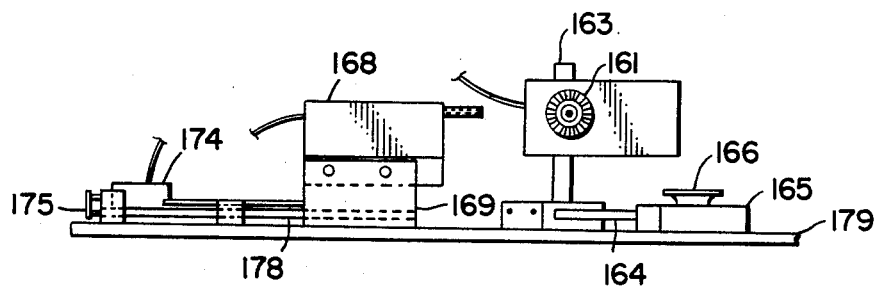
FIG. 6 is a view taken along line 6—6 of FIG. 4 and shows the relationship of the horizontal, lateral and rotational drive mechanisms associated with the surfacing process embodying the present invention.

FIG. 6 is an elevation view of the relationship of the horizontal, lateral, and rotational drive mechanism showing its methods of mechanical movements as related in FIG. 4, all mounted on a base plate (179).

INDUSTRIAL APPLICABILITY

The method and apparatus embodying present invention can generate spark temperatures in the range up to 45000 F. which, when used with a tungsten carbide electrode corresponds to the evaporation point of the electrode, but still will not be harmful to an operator. The present method can be used under atmospheric conditions without requiring a specialized gas or vacuum. The process can be used to connect a thin wire to a delicate electrical component without endangering the component. It can also be used to build up a bearing by applying a thin bronze surface without distorting the bearing or requiring further machining. Babbit, copper, brass or the like can also be used. Tungsten carbide tools can be surfaced to correct cracks, or the like. Tin or tin alloy can be used in place of expensive materials such as gold or the like. The edges of agricultural tools metallized seaming chunks and rolls, lathe collets, saw teeth or other irregular, interrupted contour shapes such as screw threads can also be surfaced. Irregular round surfaces such as cams, can also be surfaced. By varying the capacitors, a known electrostatic potential can be established thereby producing predictable results. A preferred electrode is tungsten carbide and includes the following materials and elements: 6% cobalt, 94% tungsten carbide having a grain size of 1 to 2 microns, with a hardness of 91.6–93.3 on the Rockwell A Scale. This electrode has a eutectic temperature of 1290° at which point the combination gets soft and malleable. Consider its work relation when applied by means of electronically generated spark emission to a commonly known workpiece of high speed steel having the following materials and elements: AISI, T-8 steel (high speed) with a hardness of 62–65 Rc which consists of carbon 0.80%., manganese 0.30%., silicon 0.30%., chromium 4.00%., vanadium 2.00%., tungsten 14.00%., molybdenum 0.75%., and cobalt 5.25%. This grade will exhibit incipient, or grain boundary melting at about 2380° F. and would become completely melted at about 2600° F.

Using the circuit shown in FIG. 2, changing the electrical component values of the resistor (68) feeding the diodes from the bridge rectifier powered by a 60 volt A.C. transformer secondary source such that when the resistance value is 10 ohms, the spark emitted from the electrode caused the workpiece to have a resultant surface diffusion forming a "crystalline grey" color. This acted to surface treat the tool steel by the related coating or metallic surface diffusion process which was used to harden the surface of the tool steel. When this related resistor is reduced in resistance value there is a stage when the surface of the material of the tool and the metallurgical consistency of the surface structure of the tool changes such that the surface gradually discolors from a "grey surface" color to that of a "blue tint" color. In another step when this resistance value is further reduced to 5 ohms, the current draw is greater and the similarly treated tool steel takes on a "burned metal" appearance. This last characteristic is similar to that which would result from contact of the electrode in a resistance welding unit to a workpiece.

To achieve similar results in the referenced circuit in FIG. 2, changing the capacitance variable of the circuit by means of the switch (56) place in the first contact point of the capacitance bank (63), a 5 Mfd capacitance was added in series to the placed first stage 5 Mfd capacitance successively.

A similar surface change condition would result such that with one 5 Mfd capacity condenser added in series to the original 5 Mfd capacitor in the circuit, the result would be a "burn" condition similar to that achieved with the resistance variation described above to induce a fusion-weld condition.

In a test conducted with a method of regular coating process using a 38 volt electrode to ground and the vibrating tungsten carbide sparking electrode used to contact the T-8 steel workpiece, a grey crystalline surface appeared and the surface hardness is increased and the build-up of the tool surface dimensionally is approximately 0.0009" with approximately the same amount of hardness injected under the surface.

The following conditions also occurred:

1. As the amperage draw was increased to 3.2 amperes at 38 volts the tool surface will start to "discolor", while adding 0.0011" to the metal surface;
2. If the amperage draw is increased to 4.2 amperes the metal will show a "blue tint" while depositing
3. If the amperage draw is increased to 5.1 amperes the metal surface while depositing 0.0016" on the surface, at this point "welding or fusing" of the specified tungsten carbide electrode to the T-8 tool steel will result.

A tungsten carbide electrode can be used to surface the edge of a closely placed razor blade with a current of about 3 amps. This process can also be used to surface the edge of a closely placed razor blade with a current of about 3 amps. This process can also be used with a variety of electrodes such as are disclosed in "The New Unified Numbering System For Metals and Alloys" SAE J1086. Other electrodes can include 40 percent tin and 60 percent lead, or commercial grade 2A5 tungsten carbide having the following elements: 6 percent Cobalt, 94 percent Tungsten Carbide having a grain size of 1 to 2 microns with a hardness of 91.6–93.3 on the Rockwell A Scale. This electrode has a eutectic temperature of 1290 degrees C. at which point the combination gets soft and malleable as shown in the Specifications.

Other electrodes used in this invention are a material, whose elements are Co. 62, Mo 0.28, Si 2, and CR 0.8. Structurally this electrode consists of a hard, intermetallic phase dispersed in a matrix of eutectic or solid solution . . . . Superior antifriction and antiwear bearing performance is attributed to the combination (2) the hard intermetallic phase in a softer matrix and (b) both phases resisting plastic flow and cold welding to a mating surface. This electrode used to deposit weld without dimensional distortion to the workpiece using the applicant's invention with results not possible by any other method of treatment of such a material as set out in these Specifications.

Other electrodes used were commercial grade Stellite, Stoody, etc. available in most all welding supply shops.

Still other electrodes can have a grain boundry melting point at 2380 degrees F. and become completely melted at 2600 degrees F.

Other usuable electrodes include materials having variations of basic metals of brass, copper, bronze, steel, gold, silver, stainless steel, iron, titanium, aluminum, and other conductive materials.

The process can also be used to "tin" or prepare a surface of a very thin strip of brass so that a wire could be soldered to it without thermal stresses which would endanger it.

In addition to changing the electric circuitry to suit the desired output results, one can change: the material consistency and shape of the electrode; change the size of the electrode; change the contour of the electrode; change the method of application of the electrode, and other variations such that a wide range and variety of work results can be achieved. It is possible to apply this one invention processes for: metal surface diffusion, soldering, fluxing, tinning, brazing, fusing, welding, etc. can be imparted to all types of workpieces having various natures of materials, surfaces, metallurgical contents, hardness, etc.

Similarly, rough or hard surface coating material can be added to a base metal to achieve varying results, such as to add an abrasive coating to a metal to allow it to work as a tool in an abrasive manner as that of a band saw, hole saw, cross cut saw, or hack saw.

Workpieces can include canning seaming chunks made of SS-4406 with a 0.5% moly added and are 54-58 Rockwell C. after treatment of air drawn temper of 590-610 F. for 2 hours. Other workpieces are a common hole saw, a cold rolled steel round, a hard metal wheel to be used as a grinding wheel, or the like. With a ⅛" tungsten carbide electrode to surface a seaming chunk, the apparatus is used with switch 56 in the Low position with capacitors 64 each being 10 mfds. A ⅛" electrode consisting of Co. 0.62, Mo. 0.28, Si. 0.2, and Cr. 0.8 can also be used with the maximum bank of capacitors 64 and 65 for a total capacitance of 240 mfd, switch 56 in the High position and resistors 68 and 79 in parallel to build a rough finish. A Stellite electrode can be used to provide a 0.011" buildup on a cold rolled steel, or a tungsten carbide electrode can be used on the same workpiece to provide a buildup of between 0.0029 inches and 0.0069 inches. The electrode consisting of Co. 0.62, Mo. 0.28, Si. 0.2 and Cr. 0.8 can be used on the workpiece to provide a 0.0113" buildup.

The method of this invention can also be used to fuse elements together as by spot welding, or the like, to tin an electrical component, or to make grinding wheels, files or the like, strengthening other surfaces or welds for example, or to surface materials used to cut, form mold, cast, forge, or the like. Punch press punch and die surfaces can be surfaced to provide antigaulling surface preparation.

Variation of polarity for electrode wear is provided by changing the bridge (86) output to the capacitors from positive to negative while insulating the carriage and chassis to allow this polarity reversal. It provides a different work output of the electrode, the same as the electrode polarity charge change in spark erosion of metals, (E.D.M.) in a liquid dielectric affects the wear of the electrode. Different electrodes can thus be used in air dielectric.

The vertical adjustment as shown in FIG. 4 as pin (163) or motivated variations indicate the vertical adjustment to provide universal axis application. The electrode will move in response to the requirement for variation in electrical charges between the electrode and workpiece.

The electrical switching capability using the spark arcing generator provide for the various needs of the work. The method and apparatus can be used to provide ion implantation in a metal surface and implants instantaneous heat in minute, controllable quantities. The method also provides diffusion of the molecular surface structure, and its work potentials can range from surfacing steel as it is rolled in steel mills, to surfacing the point of a needle. Different electrodes can be used to provide different work results.

I claim:

1. A method of surfacing a metal workpiece comprising steps of:
   establishing an electrostatic potential between the metal workpiece and the electrode;
   controlling the electrostatic potential between the electrode and the workpiece to a level which is essentially equal to that potential associated with glow discharge and less than that potential associated with arc welding;
   contacting the electrode to the metal workpiece at a selected location;
   withdrawing the electrode from the workpiece to create a spark arc prior to any significant current flow between the electrode and the workpiece to prevent current heating of the metal workpiece;
   moving the electrode out of contact with the metal workpiece to a position in which the spark arc is extinguished; and
   then again contacting the electrode to the metal workpiece a second time.

2. The method defined in claim 1 wherein said second contact occurs at a second location spaced from said selected location.

3. The method defined in claim 2 including steps of establishing a first electric potential between the electrode and the metal workpiece at the selected location and establishing a second electrostatic potential at a third location with the first and second potentials being different from each other.

4. The method defined in claim 1 further including a step of controlling the distance the electrode is withdrawn from the metal workpiece.

5. The method defined in claim 1 further including a step of adjusting the electrostatic potential so that no spark arc is generated during the second contact.

6. The method defined in claim 1 wherein the spark discharge melts a portion of the electrode and further including the steps of contacting the electrode and further including the steps of contacting the electrode to the metal workpiece at the second location prior to the electrode melted portion solidifying.

7. The method of claim 1 further including a step of adjusting the electrostatic potential according to the type of metal in the metal workpiece, the type of material in the electrode and the distance between the electrode and the distance between the electrode and the metal workpiece when the spark discharge occurs.

8. The method defined in claim 7 including the step of controlling the electric potential with a controlled power supply.

9. The method of claim 1 further including a step of vibrating the electrode toward and away from the metal workpiece.

10. The method defined in claim 1 further including a step of rotating the electrode about its longitudial axis.

11. The method of claim 1 further including steps of mechanically maintaining an optimum distance between the electrode and the workpiece so that said spark arc is continuously generated and extinguished as the electrode is moved across the workpiece.

12. Apparatus for surface treating a metal workpiece comprising:
   an electrode;
   electrode moving means for moving said electrode in contact with the metal workpiece and away from contact with the metal workpiece and from a first location relative to the workpiece to a second location relative to the workpiece;
   control means for maintaining an electric potential between said electrode and the metal workpiece above that electric potential associated with glow discharge and below that electric potential associated with resistance arc welding, said control means establishing a first electric potential between said electrode and the metal workpiece at said first location and a second electric potential between said electrode and the metal workpiece at said second location, said first electric potential being different from said second electric potential.

13. The apparatus defined in claim 12 wherein said electrode moving means and said control means cooperate to locate said electrode in a ready position relative to the metal workpiece in which said electric potential is at a level to melt a portion of said electrode in said ready position.

14. The apparatus defined in claim 13 wherein said electrode moving means and said control means cooperate to move said electrode molten portion into contact with said metal workpiece at said second location prior to said electrode molten portion solidifying.

15. The apparatus defined in claim 12 wherein said electrode moving means causes said electrode to vibrate toward and away from the metal workpiece.

16. The apparatus defined in claim 15 wherein said electrode moving means rotates said electrode about its longitudinal axis.

17. The apparatus defined in claim 12 wherein said electrode moving means includes a plurality of balanced resistors.

18. The apparatus defined in claim 17 wherein said electrode moving means further includes a vibrator means for moving said electrode toward and away from the surface.

19. The apparatus defined in claim 18 wherein said electrode moving means further includes a plurality of capacitors.

20. The apparatus defined in claim 19 wherein said electrode moving means further includes an indicator lamp for indicating proper operation of the electrode.

21. The apparatus defined in claim 20 wherein said electrode moving means further includes a step down transformer connected between a power supply and said capacitors.

22. The apparatus defined in claim 21 wherein said electrode moving means further includes a bridge rectifier connected between said step down transformer and said capacitors.

23. The apparatus defined in claim 12 wherein said electrode moving means further includes a horizontal feed means for maintaining a predetermined spacing between said electrode and the surface during movement of said electrode between said first and second locations.

24. The apparatus defined in claim 23 wherein said electrode moving means further includes an electrical motor.

25. The apparatus defined in claim 24 wherein said electrode moving means further includes a plurality of resistors, with at least one of said resistors being a variable resistor.

26. The apparatus defined in claim 25 wherein said plurality of resistors are connected together to form a voltage divider network.

27. The apparatus defined in claim 26 wherein said electrode moving means further includes a stop means for preventing movement of said electrode beyond a predetermined location on the surface.

28. The apparatus defined in claim 27 wherein said electric motor includes reversing means for reversing movement of said electrode when said electrode contacts said stop means.

29. The apparatus defined in claim 12 wherein said electrode moving means further includes a multi-position switch for connecting said electrode moving means to a power supply.

30. The apparatus defined in claim 12 wherein said electrode moving means further includes a lateral feed means for moving said electrode across the surface in one direction, a horizontal feed means for moving said electrode across the surface in a second direction, and a rotary feed means for moving said electrode with respect to the surface in a third direction.

31. The apparatus defined in claim 30 wherein said electrode moving means further includes a drop out relay means for selectively operating said lateral feed means, said horizontal feed means and said rotary feed means.

32. The apparatus defined in claim 31 wherein said electrode moving means further includes a plurality of resistors and a plurality of capacitors connected to a source of electrical power.

33. The apparatus defined in claim 32 wherein said electrode moving means further includes an electrical motor associated with each of said feed means.

34. The device defined in claim 33 wherein said electrode moving means further includes a bridge rectifier means connected between a power supply and said resistors.

35. The device defined in claim 34 wherein said electrode includes electrically material selected from a group consisting of brass, copper and stainless steel.

36. The device defined in claim 12 wherein said electrode includes tungsten carbide.

37. The device defined in claim 12 wherein said electrode is formed of material which includes 6 percent cobalt and 94 percent tungsten carbide having a grain size of 1 to 2 microns with a hardness of 91.6 to 93.3 on the Rockwell A scale.

38. The device defined in claim 12 wherein said electrode is formed of material which includes 40 percent tin and 60 percent lead.

39. The device defined in claim 12 wherein said electrode is formed of material which includes Co. 62; Mo. 28, Si 2 and Cr. 8.

40. The device defined in claim 12 wherein said electrode includes materials selected from a group consisting of commercial grade Stellite and Stoody.

41. A method of surfacing a metal workpiece comprising steps of:
  establishing a first electrostatic potential between an electrode and a surface of a metal workpiece;
  creating a first spark arc between the electrode and the surface at a first location;
  controlling the first electrostatic potential and duration of the spark arc so that no significant current-induced heating of the surface occurs but a portion of the electrode is melted by the spark arc;
  contacting the surface at the first location with the electrode while the electrode portion is still molten to deposit some of the electrode onto the metal surface;
  moving the electrode adjacent to a second location on the surface;
  establishing a second electrostatic potential between the electrode and the surface at the second location, the second electrostatic potential being different from the first electrostatic potential;
  creating a second spark arc between the electrode and the surface at the second location;
  controlling the second electrostatic potential and duration of the second spark are so that no significant current induced heating of the surface occurs at the second location but another portion of the electrode is melted by the spark arc; and contacting the surface at the second location with the electrode while the electrode is still molten to deposit some of the electrode onto the metal surface.

42. The method of surfacing defined in claim 41 wherein the step of controlling the electrostatic potential and duration of the spark arc permits the spark arc to transfer only as much heat to the metal workpiece and is necessary to permit quick air quenching only at the point the spark arc contacts the workpiece.

43. The method defined in claim 42 further including a step of moving an electrode tip into and out of contact with the workpiece.

44. The method defined in claim 41 further including steps of extinguishing the spark arc at each location on the surface prior to contacting the surface with the electrode.

45. The method defined in claim 41 wherein the steps of creating a spark arc each includes contacting the electrode to the surface and moving the electrode away from the surface.

46. A method of surfacing a metal workpiece comprising steps of:

locating an electrode a first prescribed distance from a surface of the metal workpiece;

establishing an electrostatic potential between the electrode and the surface;

controlling the potential and distance to establish and maintain glow discharge conditions between the electrode and the surface;

contacting the electrode to the surface at a selected location to establish a spark arc;

withdrawing the electrode from contact with the surface prior to any significant current flow between the electrode and the surface to prevent current heating of the workpiece surface;

locating the electrode at a second prescribed distance from the surface so that the spark arc melts a portion of the electrode and is extinguished; and then again contacting the electrode to the surface prior to the solidification of the melted electrode portion to deposit some of the electrode on the surface.

47. The method defined in claim 46 wherein the potential is established so the electrode is the anode and the workpiece is the cathode.

* * * * *